UNITED STATES PATENT OFFICE.

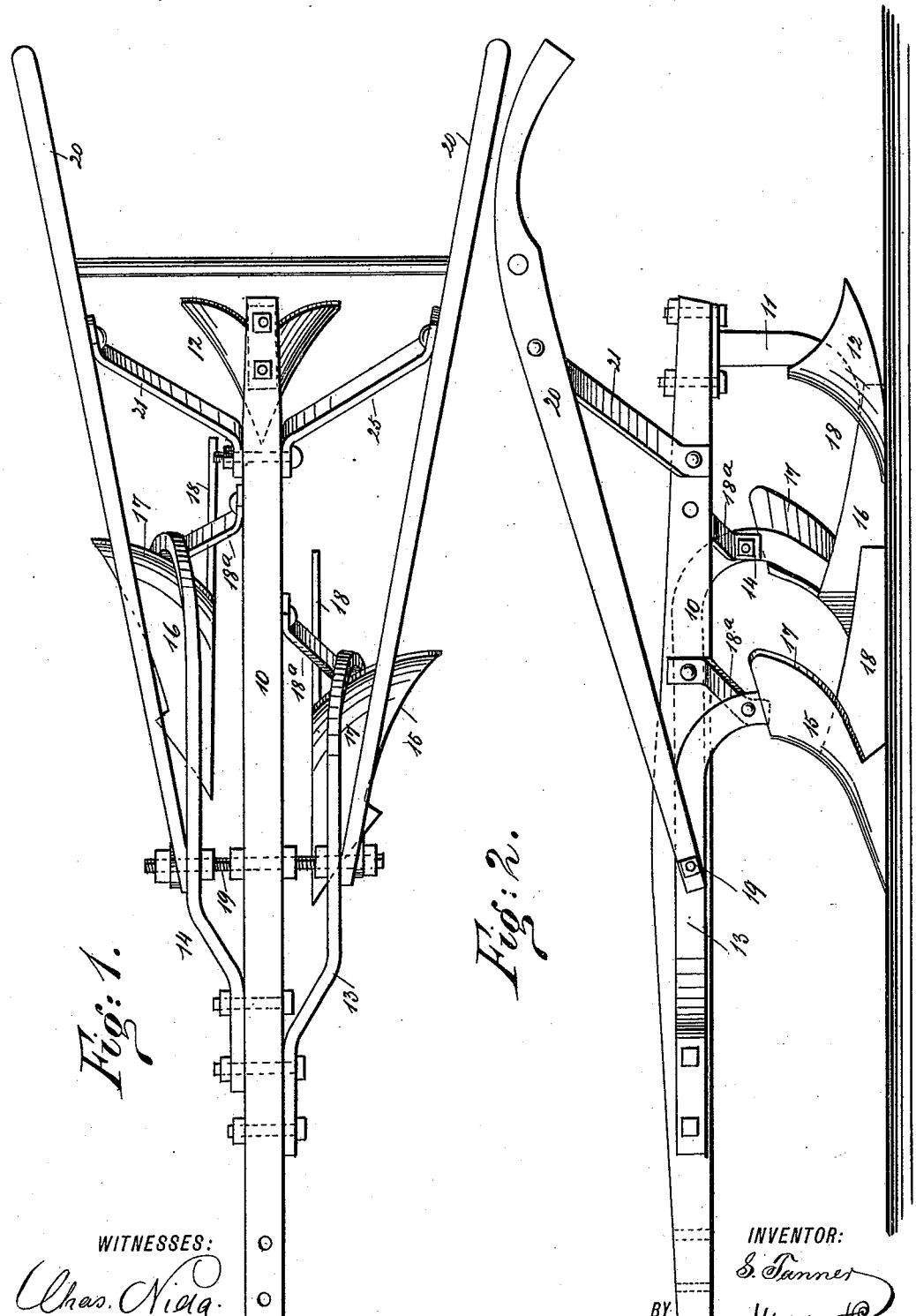

STANLY TANNER, OF CHENEYVILLE, LOUISIANA, ASSIGNOR TO HIMSELF AND CHARLES TANNER, OF SAME PLACE.

PLOW.

SPECIFICATION forming part of Letters Patent No. 421,633, dated February 18, 1890.

Application filed August 22, 1889. Serial No. 321,578. (No model.)

*To all whom it may concern:*

Be it known that I, STANLY TANNER, of Cheneyville, in the parish of Rapides and State of Louisiana, have invented a new and useful Improvement in Plows, of which the following is a full, clear, and exact description.

My invention relates to an improvement in plows, and has for its object to provide an implement especially adapted for breaking out the middle ground between rows of plants.

A further object of the invention is to provide an implement carrying a right and left plow and a sweep or double mold-board, which will follow the said plows, aligning the center of the space intervening the latter.

The invention consists in the novel construction and combination of the several parts, as will be hereinafter fully set forth, and pointed out in the claim.

Reference is to be had to the accompanying drawings, forming a part of this specification, in which similar figures of reference indicate corresponding parts in both the views.

Figure 1 is a plan view of the implement, and Fig. 2 is a side elevation of the same.

In carrying out the invention the plow-beam 10 is of any approved construction, being preferably made straight, as illustrated. To the under side of the plow-beam, at the rear end, a bar or standard 11 is secured, forwardly curved at the lower end for attachment to a double mold-board or sweep 12. Near the forward end of the plow-beam, at each side, plow-standards 13 and 14 are respectively attached. The said standards extend outward and rearward parallel with the beam, being secured at their forward ends by bolts, rivets, or equivalent fastening devices. The rear portions or lower ends of the standards are curved downward and forward, and to the standard 13 a right-hand plow 15 is secured, a left-hand plow 16 being attached to the standard 14. The standard 14, carrying the left-hand plow 16, is made to extend farther to the rear than the standard 13, whereby the plows in operation are prevented from choking. Each plow comprises a mold-board 17 and a landside 18. Each standard 13 and 14, at or near its rear end, is connected with the beam 10 by a brace $18^a$. Through the plow-beam 10 a preferably threaded bolt 19 is projected, which bolt extends beyond each side of the plow-beam and passes through the several plow-standards 13 and 14, being provided at each side of said standards with suitable lock or jam nuts. The handles 20 of the implement are preferably secured to the said threaded bolt 19 outside of the plow-standards 13 and 14, as illustrated, and the said handles are also preferably secured to the plow-beam at or near the rear of the latter by suitable brace-bars 21.

It will be observed that by reason of the bolt 19 passing through the plow-beam and plow-standards the latter are effectually prevented from riding upward.

Having thus described my invention, I claim as new and desire to secure by Letters Patent—

The herein-described plow, consisting of the beam 10, the standard 11, secured to the rear end of the beam, the sweep 12 on the lower end of the standard, the curved plow-standards 13 14 of unequal length and secured to the opposite sides of the forward end of the beam, the right and left hand plows 15 and 16, secured, respectively, to the beams 13 and 14, the braces $18^a$, connecting the rear ends of the standards 13 and 14 with the beam, the brace-bars 21, secured to the rear end of the beam, the handles 20, secured to the brace-bars and to the plow-standards by the bolt 19, and the bolt 19 provided with jam-nuts and passing through the beam, standards, and handles, as specified.

STANLY TANNER.

Witnesses:
   E. L. BLUM,
   SAM. BLUM.